(12) United States Patent
Becker et al.

(10) Patent No.: US 6,367,956 B1
(45) Date of Patent: Apr. 9, 2002

(54) READING LAMP FOR A VEHICLE INTERIOR

(75) Inventors: Stefan Becker, Geseke; Andre Hessling-Von Heimendahl; Rico Schulz, both of Lippstadt, all of (DE)

(73) Assignee: Hella Aerospace GmbH, Lippstadt (DE)

( * ) Notice: Subject to any disclaimer, the term of this patent is extended or adjusted under 35 U.S.C. 154(b) by 0 days.

(21) Appl. No.: 09/725,181

(22) Filed: Nov. 29, 2000

(30) Foreign Application Priority Data

Sep. 20, 2000 (DE) .......................................... 100 46 843

(51) Int. Cl.[7] .............................................. F21V 11/00
(52) U.S. Cl. ...................... 362/510; 362/490; 362/483; 362/479; 362/293; 362/308
(58) Field of Search ................. 362/479, 510, 362/490, 483, 583, 293, 343, 455, 800

(56) References Cited

U.S. PATENT DOCUMENTS

| | | | | |
|---|---|---|---|---|
| 4,292,664 A | * | 9/1981 | Mack | 362/293 |
| 5,022,740 A | * | 6/1991 | Maziorka | 362/455 |
| 6,173,517 B1 | * | 1/2001 | Eibner et al. | 362/800 |

FOREIGN PATENT DOCUMENTS

| | | |
|---|---|---|
| DE | 2507857 | 2/1975 |
| DE | 3446213 | 6/1986 |
| DE | 69200494 | 11/1992 |
| DE | 4437978 | 5/1996 |
| DE | 3486463 | 1/1997 |
| DE | 19729719 | 2/1998 |
| DE | 19842701 | 4/1999 |
| DE | 19830169 | 1/2000 |
| EP | 0513907 A2 | 11/1992 |
| GB | 1408955 | 11/1971 |

* cited by examiner

Primary Examiner—Stephen Husar
Assistant Examiner—Guiyoung Lee
(74) Attorney, Agent, or Firm—Birch, Stewart, Kolasch & Birch, LLP

(57) ABSTRACT

A reading lamp for a vehicle interior having a light source arranged in a lamp housing and at least one optical element which produces a cone of light for reading, whereby a reflector system is provided in the lamp housing such that light can be input into the reflector system through a color filter so that colored light is produced concentrically with the cone of the reading lamp.

11 Claims, 2 Drawing Sheets

READING LAMP FOR A VEHICLE INTERIOR

BACKGROUND OF THE INVENTION

Figure 1:
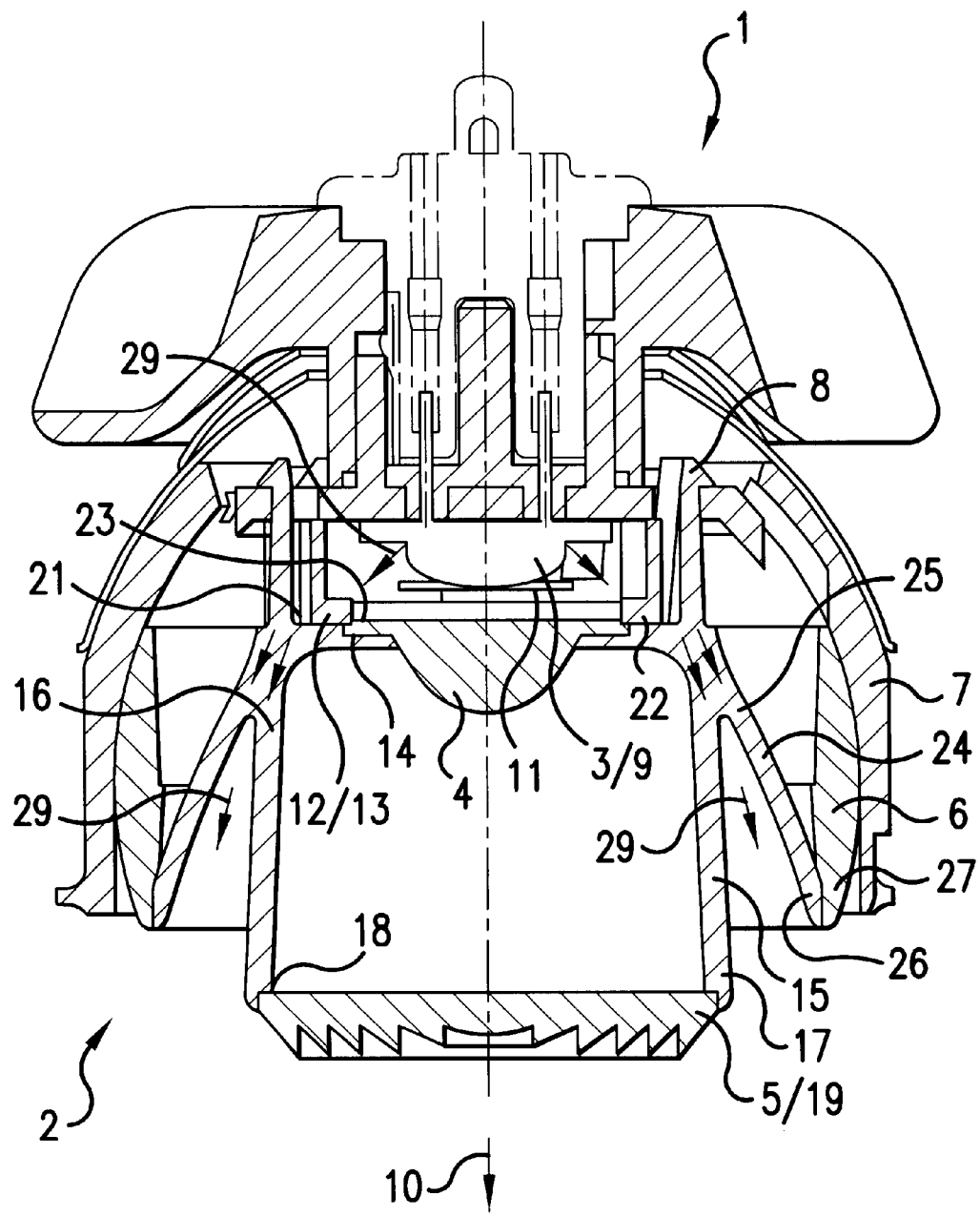

This application claims a priority from German application DE 100 46 843.8, filed Sep. 20, 2000, and the contents of that application are incorporated herein by reference.

This invention relates to a reading lamp for a vehicle interior, having a light source arranged in a lamp housing and at least one optical element for producing a cone of light for reading.

German Patent Application 25 07 857 A1 describes a reading lamp or a seat lamp for vehicles having a lamp housing which basically includes a spherical lamp body pivotally mounted in a receptacle of the lamp housing. The lamp body has a light source in the form of an incandescent bulb surrounded by a reflector. A lens which covers a housing opening in the lamp body is placed in front of the light source in a light-emission direction.

One disadvantage of this known reading lamp is that the glaring white light of the light source becomes visible when one looks into the lamp, for example when one pivots the lamp, and this is perceived as being unpleasant.

Therefore, it is an object of this invention to improve upon known reading lamps so that looking into such a lamp is not so unpleasant.

SUMMARY OF THE INVENTION

According to principles of this invention, a reading lamp for a vehicle interior having a light source arranged in a lamp housing and having at least one optical element which produces a cone of light for reading, includes a reflector system in the lamp housing arranged such that light can be input into the reflector system through a color filter so as to produce colored light concentric with the cone of the reading lamp.

When a person looks into the reading lamp, the colored light can be seen. The light emitted, that is the cone of the reading lamp, is not affected by the colored light, because the reflector system is not used for illumination but instead serves only to increase a size of a small spot of light of the light source, or to produce a surrounding lighting. This leads to a pleasant effect when one looks into the reading lamp.

According to a preferred embodiment of this invention, to produce the cone of light of the light source in the light-emission direction, a first lens and a second lens, spaced from the first lens, are placed in front of the light source. The light source is structured as a light-emitting diode which produces a clear white light. The color filter is structured as a filter ring in front of the light source in the direction of emission.

By structuring the color filter as a filter ring placed in front of the light-emitting diode, it does not affected the cone of the reading lamp and it produces the colored light concentric with the cone of the reading lamp.

According to another preferred embodiment of this invention, a reflector system has a reflector which is arranged concentric with the cone of the reading lamp and concentric with a tube supporting the lenses.

Because the reflector is arranged concentric with the tube supporting the lenses, the cone of the reading lamp is not affected by the colored light.

According to another preferred embodiment of this invention, the filter ring is structured as a colored plastic part. However, it is also possible to coat a base filter-ring member with a filter layer.

The color filter is structured to produce orange-colored light, which is perceived as pleasant. However, other colors are also possible and suitable.

According to another preferred embodiment of this invention, the color filter is structured as a carrier for the first lens, but it is also possible to form the color filter as one piece with the lens.

According to another preferred embodiment of this invention, the reflector is made of a transparent light-conductor material, so that colored light can be reflected or transmitted, into the reflector relatively easily.

Basically, the reading cone light can be produced by an optical element, which can be structured as a reflector surrounding the light source or as a lens placed in front of the light source. It is also possible to combine the lens with the reflector. In particular when using light-emitting diodes as the light source, the first and second lenses are placed in front of the light-emitting diode to produce the cone of the reading lamp.

BRIEF DESCRIPTION OF THE INVENTION

Additional details of this invention are derived from the following in-depth description and the accompanying drawings, which illustrate preferred embodiments of this invention as examples. Further benefits, characteristics and details of the invention are explained in more detail below using embodiments shown in the drawings. The described and drawn features, can be used individually or in preferred combinations in other embodiments of the invention,. The foregoing and other objects, features and advantages of the invention will be apparent from the following more particular description of the preferred embodiment of the invention, as illustrated in the accompanying drawings in which reference characters refer to the same parts throughout the different views. The drawings are not necessarily to scale, emphasis instead being placed upon illustrating principles of the invention in a clear manner.

Figure 2:
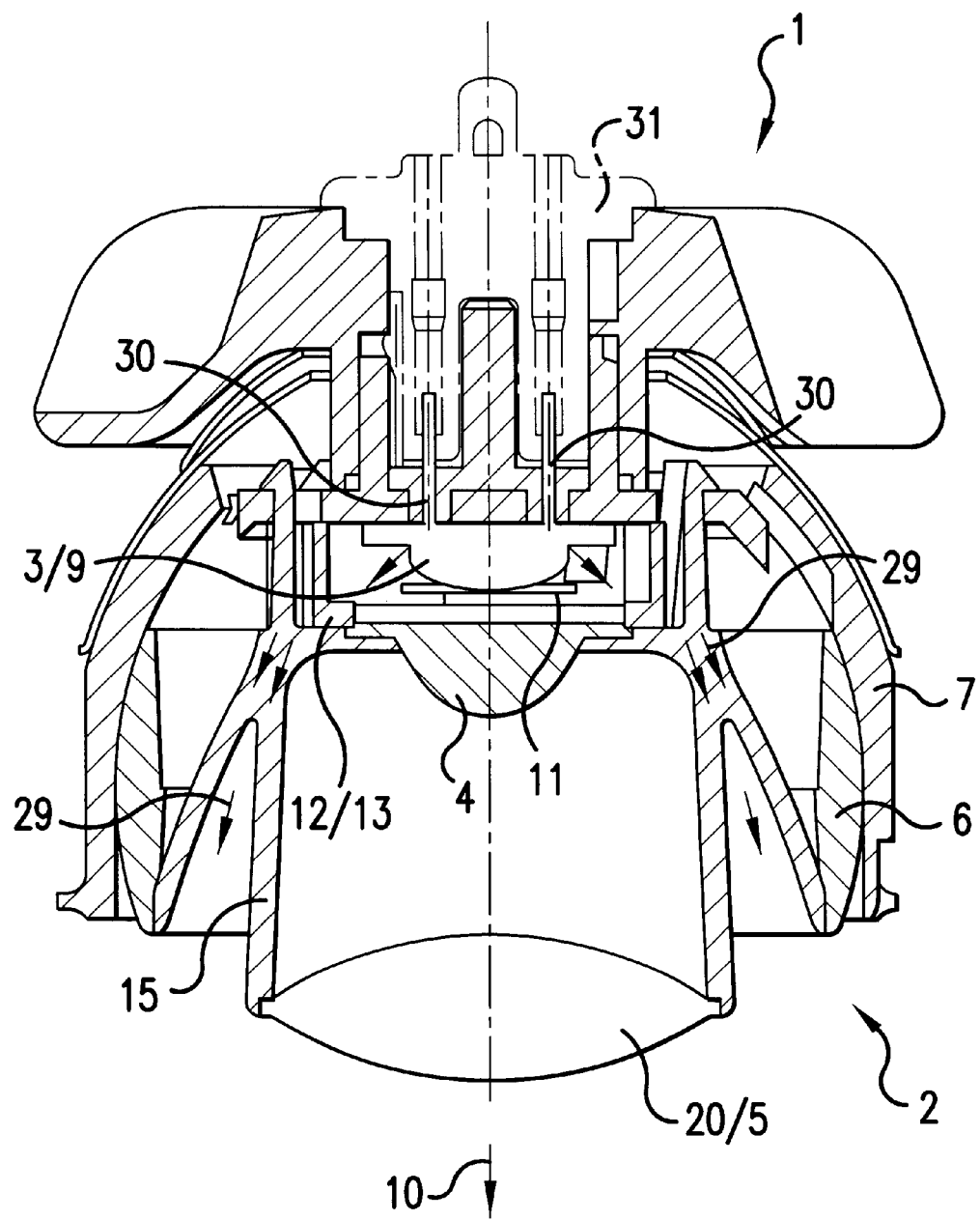

FIG. 1 is a cross-sectional side view of a reading lamp of this invention with a Fresnel lens as a second lens, FIG. 2 is a cross-sectional side view of a reading lamp of this invention with a biconvex lens as a second lens.

DETAILED DESCRIPTION OF THE INVENTION

A reading lamp 1 basically includes a lamp housing 2, a light source 3, a first lens 4 and a second lens 5.

The lamp housing 2 includes a spherically-shaped lamp body 6 which is pivotally held in a shell 7.

The lamp body 6 has the light source 3, which is structured as a light-emitting diode 9, on its rear end 8. A light shield 11 is placed in front of the light-emitting diode 9 in the light-emission direction 10. A color filter 12, which is structured as a filter ring 13, is arranged coaxially with the light-emitting diode 9. The first lens 4 is held in front of the filter ring 13 of the light-emitting diode 9 by a lens holder 14 formed on the lamp body 6. The first lens 4 is structured as a collector, or convergent, lens, preferably a planoconvex lens having a free-form surface, whose first focal point is arranged behind the light-emitting diode 9 opposite the light-emission direction 10. However, it is also possible to arrange the light-emitting diode 9 and/or its light shield 11 directly at the focal point of the first lens.

The lamp body 6 has a tube 15 whose rear end 16 develops into the lens holder 14, and on whose free end 17, facing away from the rear end 16, the second lens 5 is held in a shoulder 18 in front of the first lens 4. According to a first embodiment, the second lens 5 is structured as a Fresnel lens 19. According to a second embodiment, the second lens 5 is structured as a biconvex lens 20.

The color filter 14 is structured as an orange colored plastic part which produces orange colored light. The color filter 12 is arranged concentric with the light-emitting diode 9 in a shoulder 21 of the lamp body 6 or tube 15, and its end face 22, which faces away from the light-emitting diode 9, strikes a planar face 23 of the first lens 4, which is the planoconvex lens, on the light-emitting-diode side of the first lens.

A reflector 24 is arranged concentric with the tube 15 which has the lenses 4, 5. A rear end 25 of the reflector 24, which faces the light source 3, is connected to the tube 15. The reflector 24 is mounted at its front end 26, which faces away from the rear end 25, on an outer spherical wall 27 of the lamp body 6.

Light beams 29 emitted by the light-emitting diode 9 and passing to the side of the light shield 11 are filtered by the color filter 12 or filter ring 13 and are coupled into the reflector 24 or the rear end 16 of the tube 15 and are perceived as colored surrounding brightness when one looks into the reading lamp 1.

What is claimed is:

1. A reading lamp for a vehicle interior having a light source arranged in a lamp housing and having at least one optical element which produces a reading cone of light for reading, wherein a color filter and a reflector system are provided in the lamp housing (2), so that light (29) can be input into the reflector system through the color filter (12) in such a way that colored light is produced to be concentric with and to surround the reading cone of light of the reading lamp.

2. The reading lamp of to claim 1, wherein to produce the reading cone of light of the light source (3) in the light-emission direction (10), a first lens (4), and a second lens (5) spaced therefrom, are placed in front of the light source, in a light emitting direction, with the light source (3) being structured as a light-emitting diode (9).

3. The reading lamp of claim 1, wherein the color filter (12) is structured as a filter ring (13) placed in front of the light source (3) for surrounding the reading cone of light in the light-emission direction (10).

4. The reading lamp of claim 3, wherein the filter ring (13) is structured as a colored plastic part.

5. The reading lamp of claim 3, wherein the filter ring (13) is a member with a coated filter layer.

6. The reading lamp of claim 1, wherein the color filter (12) produces orange colored light.

7. The reading lamp of claim 2, wherein the color filter (12) is structured as a carrier for the first lens (4).

8. The reading lamp of claim 2, wherein the color filter (12) is formed as one piece with the lens (4).

9. The reading lamp of claim 2, wherein the reflector system has a reflector (24) which is concentric with the reading cone of light of the reading lamp and with a tube (15) supporting the first and second lenses (4, 5).

10. The reading lamp of claim 9, wherein the reflector (24) is made of a transparent material that conducts light for conducting the colored light.

11. The reading lamp of claim 1, wherein the reading cone of light is not substantially affected by the colored light.

* * * * *